(12) United States Patent
Jain et al.

(10) Patent No.: US 11,574,132 B2
(45) Date of Patent: *Feb. 7, 2023

(54) UNSUPERVISED TUNABLE STYLIZED TEXT TRANSFORMATIONS

(71) Applicant: International Business Machines Corporation, Armonk, NY (US)

(72) Inventors: Parag Jain, Bangalore (IN); Amar P. Azad, Bangalore (IN); Abhijit Mishra, Bangalore (IN); Karthik Sankaranarayanan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/132,308

(22) Filed: Dec. 23, 2020

(65) Prior Publication Data

US 2021/0110118 A1    Apr. 15, 2021

Related U.S. Application Data

(63) Continuation of application No. 16/046,139, filed on Jul. 26, 2018, now Pat. No. 10,915,712.

(51) Int. Cl.
*G06F 40/40* (2020.01)
*G06N 3/08* (2006.01)
(Continued)

(52) U.S. Cl.
CPC ............ *G06F 40/40* (2020.01); *G06F 40/166* (2020.01); *G06N 3/08* (2013.01); *G06F 40/30* (2020.01)

(58) Field of Classification Search
CPC ........ G06F 40/40; G06F 40/166; G06F 40/30; G06N 3/08
See application file for complete search history.

(56) References Cited

U.S. PATENT DOCUMENTS

| 7,873,519 B2 * | 1/2011 | Bennett ................. G06F 40/237 704/243 |
| 9,262,409 B2 | 2/2016 | Anisimovich et al. |

(Continued)

FOREIGN PATENT DOCUMENTS

CN       107291696 A    10/2017

OTHER PUBLICATIONS

Young et al., Recent Trends in Deep Learning Based Natural Language Processing, Cornell University Library; Feb. 20, 2018.
(Continued)

*Primary Examiner* — Scott T Baderman
*Assistant Examiner* — Mario M Velez-Lopez
(74) *Attorney, Agent, or Firm* — Ryan, Mason & Lewis, LLP (57) ABSTRACT

Methods, systems, and computer program products for unsupervised tunable stylized text transformations are provided herein. A computer-implemented method includes identifying amendable portions of input text by processing at least a portion of the input text using at least one neural network; determining stylistic text modifications to the amendable portions of the input text, the text modifications encompassing a set of stylistic parameters, wherein said determining comprises processing at least a portion of the set of stylistic parameters using at least one neural network; generating a stylized output set of text by transforming at least a portion of the input text, wherein said transforming comprises modifying at least one of the amendable portions of the input text via at least one of the stylistic text modifications encompassed by the set of stylistic parameters; and outputting the stylized output set of text to at least one user.

19 Claims, 6 Drawing Sheets

(51) Int. Cl.
  *G06F 40/30* (2020.01)
  *G06F 40/166* (2020.01)

(56) References Cited

U.S. PATENT DOCUMENTS

| | | | | |
|---|---|---|---|---|
| 10,417,554 | B2 | 9/2019 | Scheffler | |
| 11,062,085 | B2* | 7/2021 | Verma | G06F 40/166 |
| 2011/0184727 | A1* | 7/2011 | Connor | G06F 40/253 |
| | | | | 704/E11.001 |
| 2012/0251016 | A1* | 10/2012 | Lyons | G06F 40/151 |
| | | | | 382/276 |
| 2015/0269125 | A1* | 9/2015 | Desai | G06Q 10/107 |
| | | | | 715/752 |
| 2016/0162576 | A1* | 6/2016 | Ariño de la Rubia | |
| | | | | G06F 40/279 |
| | | | | 707/739 |
| 2016/0294755 | A1* | 10/2016 | Prabhu | H04L 51/046 |
| 2017/0039174 | A1* | 2/2017 | Strope | G06F 40/40 |
| 2019/0079922 | A1* | 3/2019 | Moskowitz | G06Q 10/10 |
| 2019/0236148 | A1* | 8/2019 | DeFelice | G06N 3/0472 |
| 2019/0295533 | A1* | 9/2019 | Wang | G10L 15/22 |
| 2020/0311195 | A1* | 10/2020 | Mishra | G06F 40/151 |
| 2021/0264109 | A1* | 8/2021 | Srinivasan | G06N 3/088 |

OTHER PUBLICATIONS

Weiss et al., Sequence-to-Sequence Models Can Directly Translate Foreign Speech, Jun. 2017.

Post et al. (2008). Deal or no deal? decision making under risk in a large-payoff game show. The American economic review, 98(1), 38-71.

Peters et al. (2008). Reinforcement learning of motor skills with policy gradients. Neural networks, 21(4), 682-697.

Kabbara et al., Stylistic Transfer in Natural Language Generation Systems Using Recurrent Neural Networks, Proceedings of EMNLP 2016 Workshop on Uphill Battles in Language Processing: Scaling Early Achievements to Robust Methods, pp. 43-47.

Harsh et al., Shakespearizing Modern Language Using Copy-Enriched Sequence-to-Sequence Models, EMNLP 2017 Workshop on Stylistic Variation.

Ficler et al., Controlling Linguistic Style Aspects in Neural Language Generation, ., EMNLP 2017 Workshop on Stylistic Variation.

Hu et al., Controllable Text Generation, 2017.

Ghosh et al., Affect-LM: A Neural Language Model for Customizable Affective Text Generation, 2017.

List of IBM Patents or Patent Applications Treated as Related.

* cited by examiner

UNSUPERVISED TUNABLE STYLIZED TEXT TRANSFORMATIONS

FIELD

The present application generally relates to information technology, and, more particularly, to text generation techniques.

BACKGROUND

Generating natural language from machine representation systems is a common and increasingly important function. Existing natural language generation (NLG) systems, such as translators, summarizers, dialog generators, etc., while common, cannot produce variable output based on user-desired tunable specifications. Additionally, such existing systems cannot take input in the form of a variable form of text and a variable set of specifications, and output a transformed version of the input text according to the specifications. Further, such existing systems are generally not readily extendable.

SUMMARY

In one embodiment of the present invention, techniques for unsupervised tunable stylized text transformations are provided. An exemplary computer-implemented method can include identifying one or more amendable portions of input text by processing at least a portion of the input text using at least one neural network, and determining one or more stylistic text modifications to the one or more amendable portions of the input text, the one or more text modifications encompassing a set of one or more stylistic parameters, wherein said determining includes processing at least a portion of the set of one or more stylistic parameters using at least one neural network. The method can also include generating a stylized output set of text by transforming at least a portion of the input text, wherein transforming includes modifying at least one of the one or more amendable portions of the input text via at least one of the one or more stylistic text modifications encompassed by the set of one or more stylistic parameters. Further, the method can additionally include outputting the stylized output set of text to at least one user.

In another embodiment of the invention, an exemplary computer-implemented method can include generating a stylized output set of text by transforming the input text, wherein the transforming comprises modifying, using one or more unsupervised natural language processing systems, at least one of the one or more stylistically amendable portions of the input text via at least one of the one or more stylistic text modifications encompassed by the set of one or more stylistic parameters. Such a method can also include training the one or more unsupervised natural language processing systems using the generated stylized output set of text, and performing one or more subsequent stylized text transformations using the one or more trained unsupervised natural language processing systems.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes unsupervised tunable stylized text transformations. At least one embodiment of the invention includes generating tunable stylized text (such as, for example, one or more sentences) by transforming received user text input and one or more user-originated stylistic parameters (directed to polarity of subjective opinion, such as sentiments, valence, emotions, formal, business, readability, etc.) in vector form, using unsupervised natural language processing (NLP) systems such as rule-based and/or machine learning-based classifiers and/or regressors, metric computation systems as style scorers, etc.

Such an embodiment can include receiving and/or obtaining a sequence of words as user input, and passing the user input through a neural network module comprising an embedding layer and an encoder layer (which can include a text encoder and a style encoder) in order to identify one or more tunable style parameters (sentiments, emotions, mood, etc.) in vector form from the user input. In at least one embodiment of the invention, such a vector includes N elements, with each element depicting a level of a desired stylistic parameter. Additionally, such a vector can take value in R, which can be defined in one or more pre-processing steps. For example, if vector V is defined as [sentiment(negative/positive), formal(low-high as 0-1), readability(0-5], then V=[0, 0.4, 1] means that, in the output, it is desired that a sentiment level be negative, a formal level be 0.4, and a readability level be 1 out of 5.

Additionally, one or more embodiments of the invention include merging the outputs of the encoder layers, passing the merged output (in vector form) through a decoder layer that contains one or more bi-directional long short-term memory networks (LSTMs), followed by a softmax regression layer. As noted above, the output of the text embedding encoder layer and style embedding encoder layer are merged (for example, a concatenation). This can represent a latent space layer which is then passed to the decoder layer. Additionally, the LSTMs layer encodes a sequence of words (text) of the input sentence into a latent space representation, and the softmax layer converts the output of the decoder into a probability distribution which is used to produce an output sentence. Accordingly, at least one embodiment of the invention includes training an unsupervised NLP system to determine one or more text styles using the output (in vector form) text generated by the decoder layer using the bidirectional LSTMs.

Further, one or more embodiments of the invention include generating tunable stylized output text by analyzing and transforming each of the obtained input text as per the determined input style specification derived from the decoder output, using the trained unsupervised NLP system. By way of example, the trained unsupervised NLP system can include rule-based and/or machine learning-based classifiers and/or regressors, and/or one or more metric computation systems. In one or more embodiments of the invention, example metric computation systems can include a readability grade scorer, a sentence fluency scorer, and a semantic relatedness scorer.

Additionally, at least one embodiment of the invention includes determining one or more style parameters of transformed text. Such an embodiment includes implementing one or more user-defined style parameters as a range of values. By way merely of illustration, an example style parameter and value range can include the following: Flesch-Kincaid readability index ranging [0,100]. Based on such parameters, input text can be transformed in an unsupervised manner (that is, labeled data are not required for training for text transformations based on the input style parameters). Further, one or more embodiments of the invention can also include measuring the parameters of the generated text. More specifically, the generated text can be passed through scorers of different style parameters and one or more semantic relatedness scorers. The resulting scores are then compared, along with the inputted desired style parameter and the related score. Based on the difference in the scores, feedback is sent to a generator model until the desired score is achieved, which results in the desired transformation of the input text as the generated text.

By way merely of example and not limitation, illustrative use cases of generating transformed text in correspondence with input text and a set of external tunable parameters in vector form can include transforming input text to adopt a general style (for example, transforming the text to include a persuasive tone or style), and/or transforming input text to adopt a personal style (for example, transforming the text to encompass the style of any person, if the style is measurable). Example use cases can additionally include transformations involving variable-length and/or variable-linguistic complexity (specified as input) abstractive summarization, as well as domain-driven text transformations (for example, transforming a technical article on quantum physics to a generic domain text which can be understood by a non-technical person, or vice-versa). As noted above, an abstractive summarization can refer, for example, to a summarization of an input paragraph to multiple sentences, while retaining semantic relatedness. Moreover, an abstractive summarization can be carried out across one or more domains (for example, from a paragraph about quantum physics to plain language English sentences, or vice versa).

Additionally, as detailed herein, one or more embodiments of the invention include adaptability to add or remove one or more parameters to/from input specifications. Further, at least one embodiment of the invention can be implemented independently or can be plugged-in to any existing NLG system.

Figure 1:
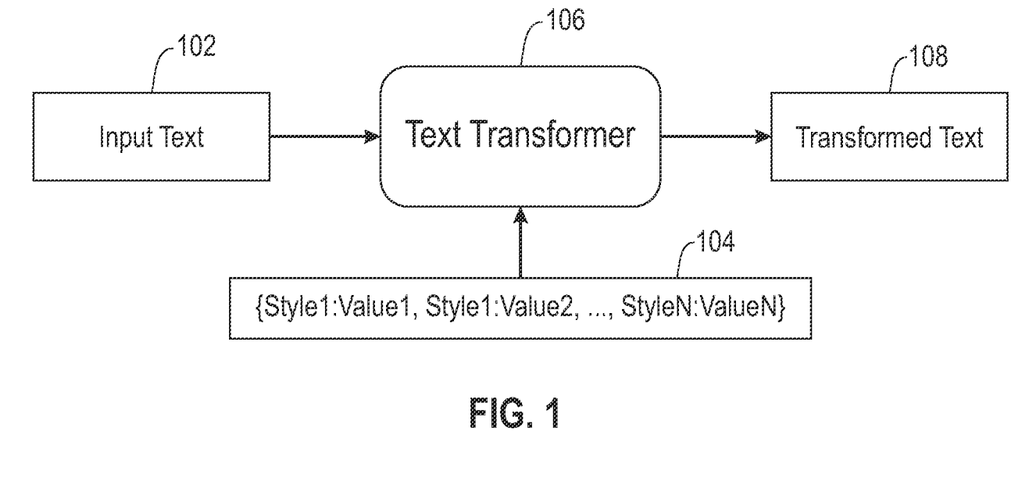
FIG. 1 is a diagram illustrating a system overview, according to an exemplary embodiment of the invention.

FIG. 1 is a diagram illustrating a system overview, according to an embodiment of the invention. By way of illustration, FIG. 1 depicts input text 102 and a set of one or more tunable style parameters 104, which are provided as input to a text transformer 106, which uses such inputs to generate a set of transformed text 108, as further detailed herein. By way of example, tunable style parameters can include wording parameters (with a value such as, for example, "formal"), sentiment parameters (with a value such as, for example, "negative"), word count parameters (with a value such as, for example, "less than 30"), etc.

By way merely of illustration, consider the following examples of input text and corresponding output text, transformed via implementation of one or more embodiments of the invention. In a first example, input text can include "There are no boundaries to the age of people who enjoy books, and the inclusion of the cafe is a scheme that potentially has ill effects where young readers are concerned, while a transformed output (transformed using terseness (high), complexity (high), and sentiment (negative) parameters) can include "The inclusion of the cafe is unwise, as it has potentially ill effects for young readers, and there are no boundaries to the age of people who enjoy books."

In a second example, input text can include "All the problems have combined together to create a serious crisis," while a transformed output (transformed using terseness (high), complexity (high), and sentiment (neutral) parameters) can include "All of these problems have combined to create a crisis." Further, in a third example, input text can include "In my experience, a book is best enjoyed with a hot cup of coffee and a cool breeze, which makes the day perfect and allows you to relax and enjoy the story," while a transformed output (transformed using terseness (medium), complexity (medium), and sentiment (positive) parameters) can include "A book is best enjoyed with a cup of coffee and a cool breeze, which makes for a perfectly relaxing day to enjoy a story."

Figure 2:
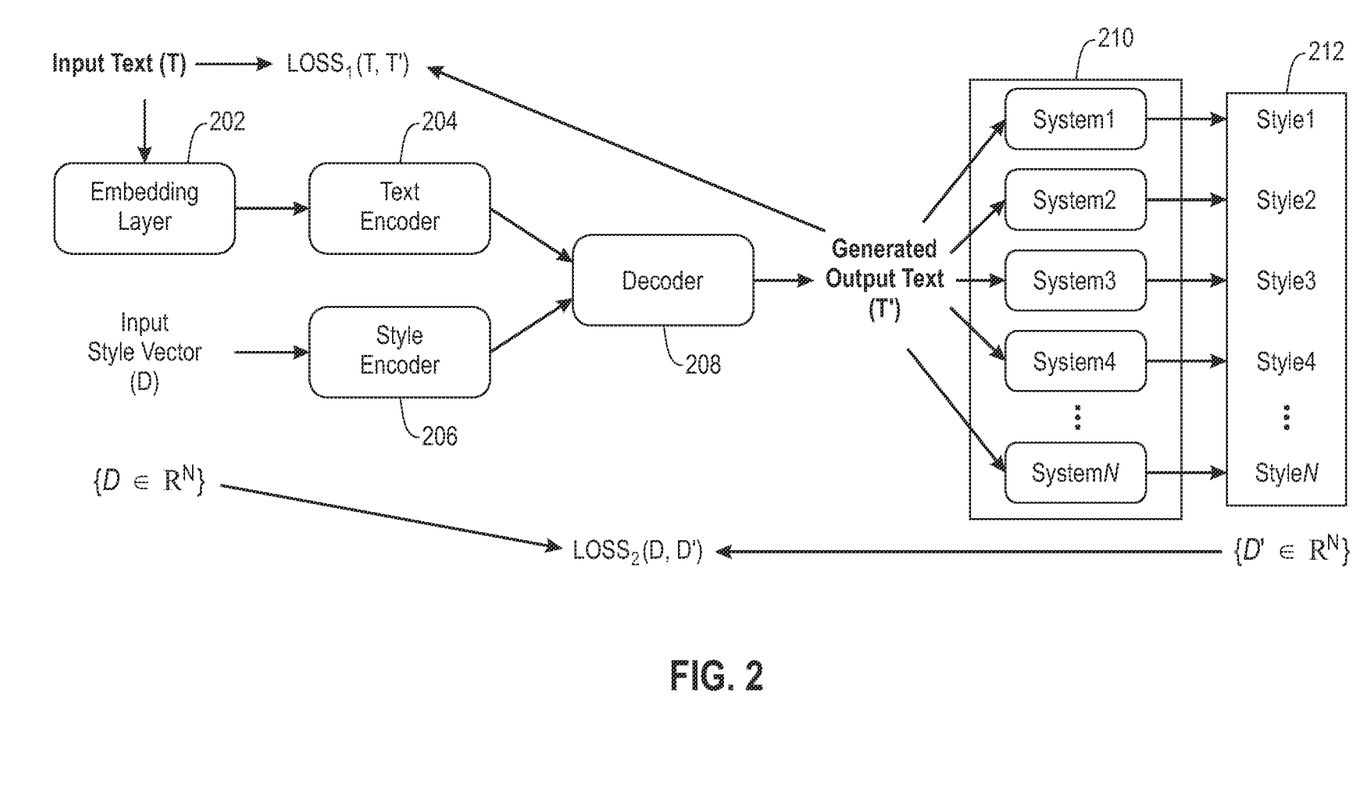
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts input text (T), which is provided to an embedding layer 202 as well as to a first loss component ($LOSS_1$ (T, T')), further described herein. Also, FIG. 2 depicts an input style parameter vector (D), which is provided to a style encoder 206. Further, FIG. 2 depicts a vector component ($\{D \in \mathbb{R}^N\}$), which provides input to a second loss component ($LOSS_2$ (D, D')), further described herein. As used herein, with respect to $\{D \in \mathbb{R}^N\}$, D has dimension N, wherein each dimension can take a real number. In one or more other embodiments, D is an N-sized vector with each element being a real number.

The input text (T) can include a sequence of words fed to the embedding layer 202 (for example, in the form of one-hot representation), while the input (tunable) style parameters can include a vector of which each component (real valued or binary) in the vector corresponds to one tunable parameter. As illustrated, the input text (T) is passed through a neural network module comprising the embedding layer 202 and an encoder layer (represented as text encoder 204). More specifically, the embedding layer 202 (also referred to herein as a text encoder) embeds words into a (fixed length) vector. The vector can be based, for example, on the size of vocabulary used in the entire context document. The encoder layer can include, for example, multiple sub-layers of bidirectional LSTMs.

As noted above, the input style parameter vector (D) is directly passed through a separate encoder layer (represented as the style encoder 206), which is a feed-forward network. In one or more embodiments of the invention, the style parameter vector (D) encodes N style parameters into an N-dimension vector, wherein each element represents a style which can take a value of a real number. Also as used herein, a feed-forward network is a neural network-based structure which provides output in only the forward direction for input (-fed) values. For example, one or more embodiments of the invention include a neural network which takes a sentence and provides an output in the form of a transformed version of that input sentence.

Additionally, as depicted in FIG. 2, the outputs of the text encoder 204 and the style encoder 206 are merged and passed through a decoder layer 208, which contains bidirectional LSTMs followed by a softmax regression layer, and which generates output text (T'). The generated output text (T') can be provided the loss component ($LOSS_1$ (T, T')). Also, the generated output text (T') is passed through a set of NP systems 210, which can measure and/or predict one or more sets of style parameters 212 for the text in the same order as the input style parameters. The scorer values of the output sentence are encoded in a vector of the same length and order of styles as the input style vector(s) provided. For example if input style vector V of three dimensions is represented as V=[relatedness, formal, readability], then the output style vector can be formed from scores as [relatedness score, formal score, readability scorer]. Accordingly, the input vector and output vector can be compared, and the feedback can be provided to the neural network for training. Further, input text (T) can be transformed as per the input tunable style parameters/specifications (D) such that the output text (T') is semantically related to the input text (T), conveying a desired meaning.

Systems within system set 210 can include, for example, one or more classifiers, one or more regressors, and/or one or more metric computation systems. Additionally, in one or more embodiments of the invention, any existing black box system and/or system built offline can be used. For example, referring to the system set 210 in FIG. 2, System1 could correspond to a subjective polarity scorer, System2 could correspond to a formalness and tone estimator/scorer, etc.

At least one embodiment of the invention includes training a neural network. Such training can include using iterative optimization techniques such as, for example, stochastic gradient descent (SGD). Training data can include a set of unlabeled text (of any kind) and a set of randomly-generated styling parameter vectors. Additionally, as illustrated in FIG. 2, a composite loss of $LOSS_1$ (T, T') and $LOSS_2$ (D, D') can be minimized during training. $LOSS_1$ corresponds to the semantic relatedness between input text (T) and generated text (T'), and $LOSS_2$ corresponds to the distance between input vector (D) and computed vector (D') as the output of the classifiers, regressors and/or metric evaluators.

Also, one or more embodiments of the invention can include handling non-differentiable computations. In such an embodiment, one or more of the classifiers, regressors and/or metric evaluators can be non-differentiable functions, resulting in non-differentiable losses. Carrying out an example embodiment of the invention that includes such non-differentiable functions includes using one or more principles of reinforcement learning (such as, for example, a log-derivative technique applied on policy gradients with non-differentiable losses taken for defining policies).

At least one embodiment of the invention includes testing a neural network. In such an embodiment, text and a vector of one or more tunable parameters are obtained as input to the network, and transformed text is generated (using the input text and vector) as output. Additionally, the one or more tunable parameters can be measured and/or predicted by one or more NLP systems, and used and/or generated as auxiliary output.

As detailed herein, one or more embodiments of the invention include the capability of adding and/or removing parameters to an input tunable parameter set. For the addition of a new parameter, such an embodiment can include utilizing a classifier, regressor and/or metric to measure the parameter to be added. For the deletion of a parameter, such an embodiment can include removing the corresponding component (for example, the corresponding classifier, regressor and/or metric) from the one or more NLP systems. Further, such an embodiment can also include undergoing additional training after the addition or removal of a parameter.

At least one embodiment of the invention includes implementing one or more deep learning execution platforms for implementing the encoder and decoder components. Also, with respect to each tunable input parameter, one or more embodiments of the invention can include implementing an NLP framework to be used for text normalization, tokenization, learning embedding, semantic relatedness measurement, etc.

Figure 3:
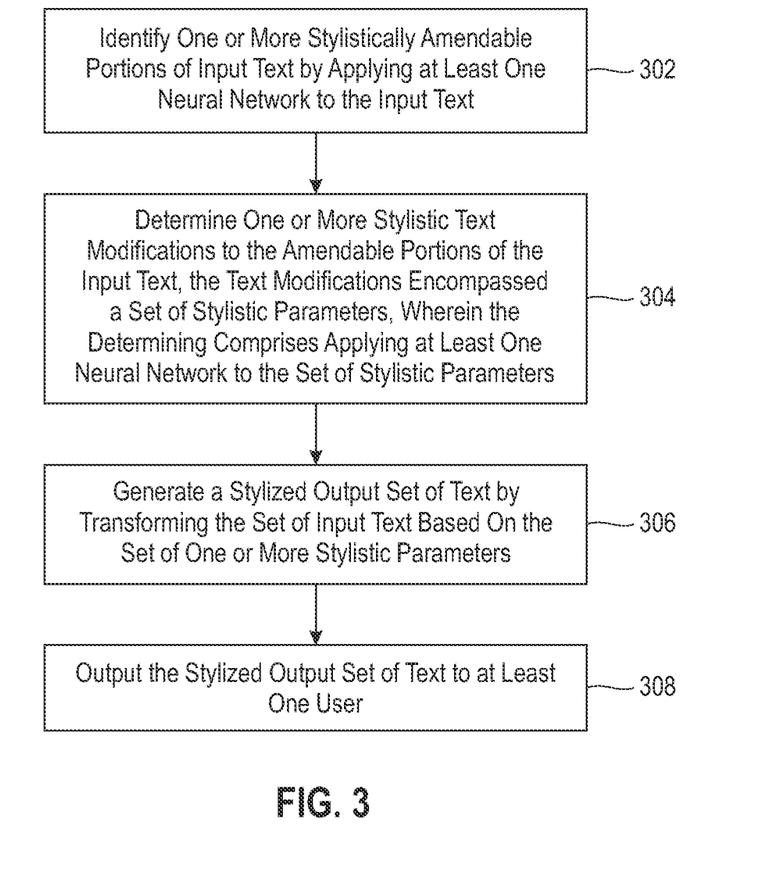
FIG. 3 is a flow diagram illustrating techniques according to an embodiment of the invention.

FIG. 3 is a flow diagram illustrating techniques according to an embodiment of the present invention. Step 302 includes identifying one or more stylistically amendable portions of input text by applying at least one neural network to the input text. Step 304 includes determining one or more stylistic text modifications to the amendable portions of the input text, the text modifications encompassing a set of one or more stylistic parameters, wherein the determining comprises applying at least one neural network to the set of one or more stylistic parameters. The input text and the set of one or more stylistic parameters can be provided by at least one user. Additionally, the set of one or more stylistic parameters can be represented by a vector. Further, the set of one or more stylistic parameters can include one or more tunable stylistic parameter, such as, for example, sentiment-based parameters, readability, formalness, tone, persuasiveness, etc.

Step 306 includes generating a stylized output set of text by transforming the input text based at least in part on the set of one or more stylistic parameters, wherein the transforming comprises modifying at least one of the one or more stylistically amendable portions of the input text via at least one of the one or more stylistic text modifications encompassed by the set of one or more stylistic parameters. Additionally, transforming can include implementing one or more (supervised, unsupervised, or rule-based) natural language processing systems. The one or more natural language processing systems can include one or more rule-based classifiers, one or more machine learning-based classifiers, one or more regressors, and/or one or more metric computation systems. Further, in at least one embodiment of the invention, transforming can include implementing one or more bi-directional long short-term memory networks trained in an unsupervised fashion (that is, without using annotated or labelled or parallel text/data corpus), as well as implementing a softmax function that facilitates calculation of a composite loss function. In one or more embodiments of the invention, the composite loss function comprises (i) loss pertaining to a semantic deviation of the stylized output set of text from the input text and (ii) loss pertaining to a divergence of one or more stylistic control (tunable) parameter scores given as input and computed from one or more stylistic control (tunable) parameter scores output using one or more natural language processing scorers.

Step 308 includes outputting the stylized output set of text to at least one user. The techniques depicted in FIG. 3 can also include adding one or more stylistic parameters to the set of one or more stylistic parameters, adding, to the at least one neural network to measure the one or more added stylistic parameters, at least one of (i) at least one classifier corresponding to the one or more added stylistic parameters, (ii) at least one regressor corresponding to the one or more added stylistic parameters, and (iii) at least one metric corresponding to the one or more added stylistic parameters, and training the at least one neural network after such an addition to the neural network. Additionally, the techniques depicted in FIG. 3 can also include removing one or more stylistic parameters from the set of one or more stylistic parameters, removing, from the at least one neural network, at least one of (i) at least one classifier corresponding to the one or more removed stylistic parameters, (ii) at least one regressor corresponding to the one or more removed stylistic parameters, and (iii) at least one metric corresponding to the one or more removed stylistic parameters, and training the at least one neural network after such a removal from the neural network.

Also, an additional embodiment of the invention includes generating a stylized output set of text by transforming the input text based at least in part on the set of one or more stylistic parameters, wherein the transforming comprises modifying, using one or more unsupervised natural language processing systems, at least one of the one or more stylistically amendable portions of the input text via at least one of the one or more stylistic text modifications encompassed by the set of one or more stylistic parameters. Such an embodiment can also include training the one or more unsupervised natural language processing systems using the generated stylized output set of text, and performing one or more subsequent stylized text transformations using the one or more trained unsupervised natural language processing systems.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
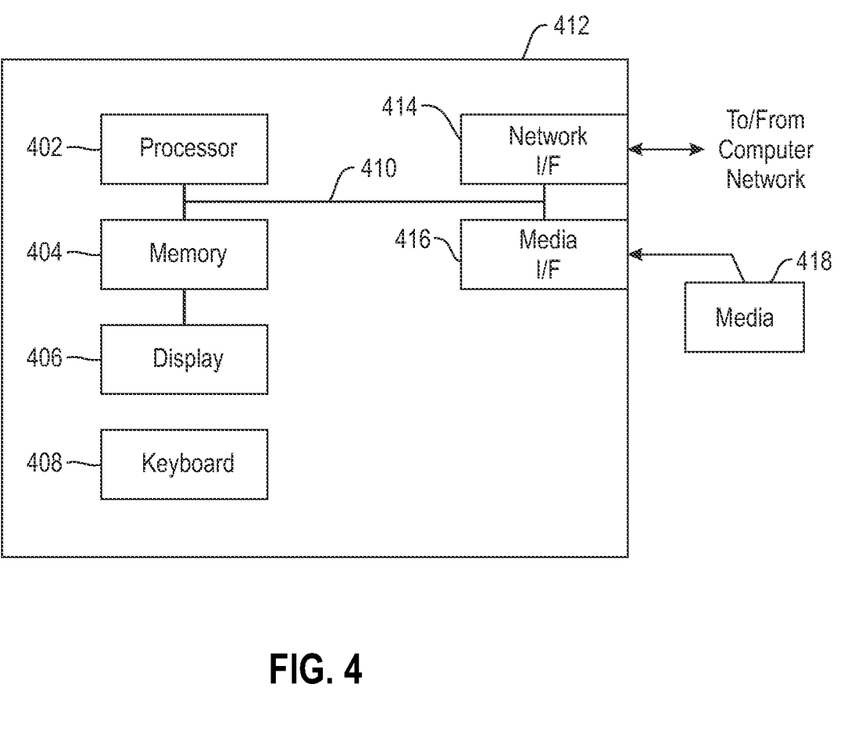
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
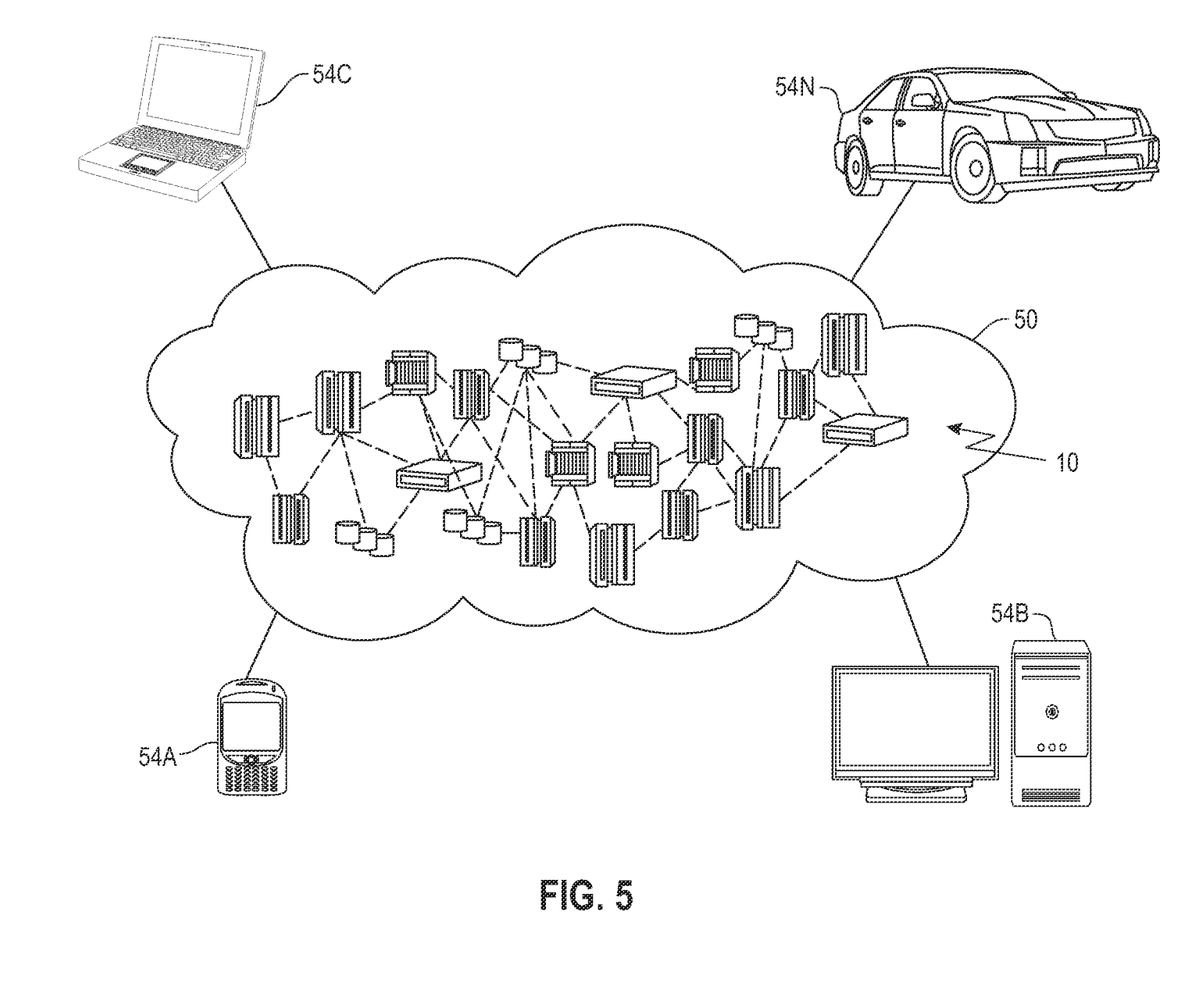
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
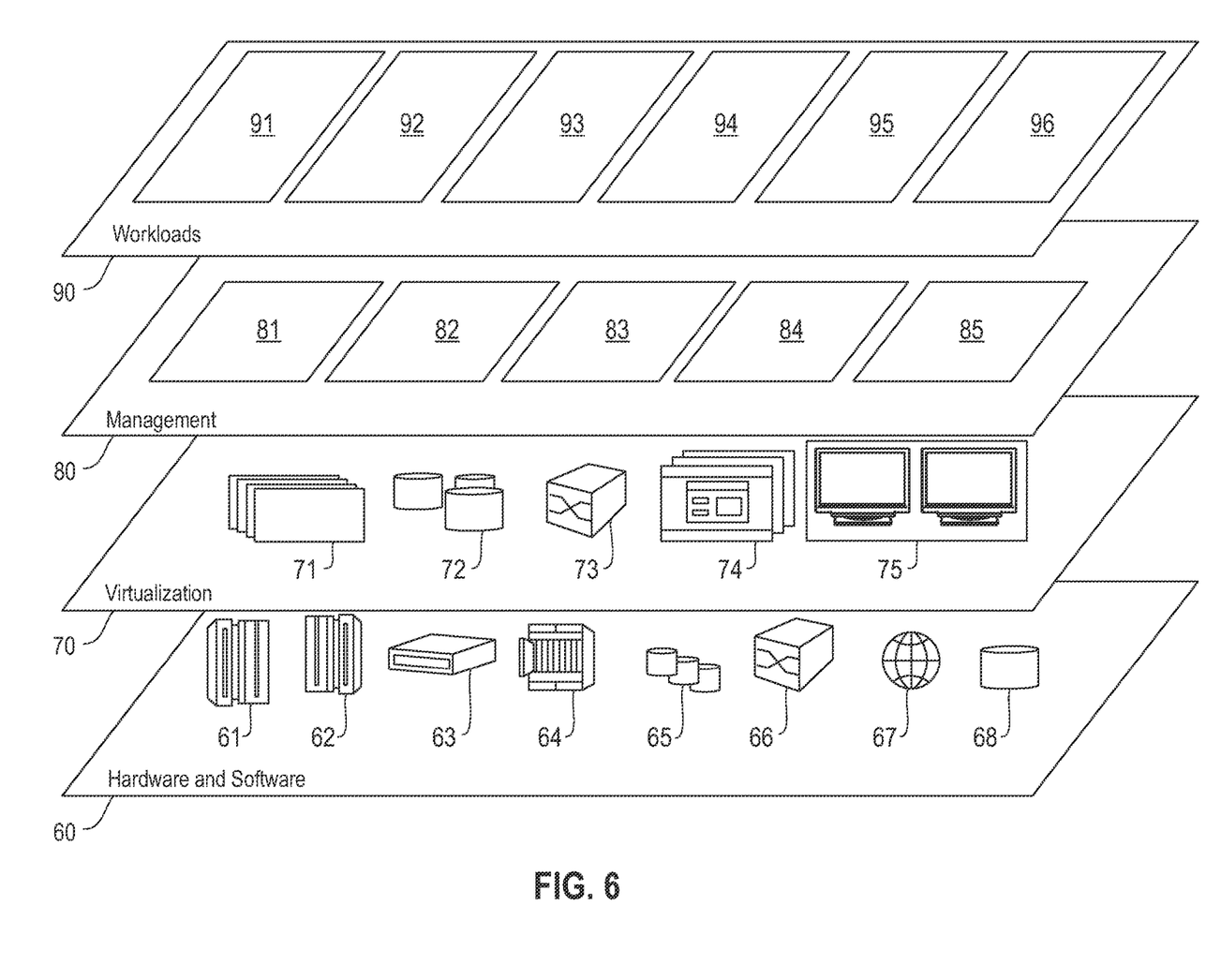
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and unsupervised tunable stylized text transformation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, generating tunable stylized text by obtaining stylistic parameters obtained from user text input and applying unsupervised NLP systems thereto.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    identifying one or more amendable portions of input text by processing at least a portion of the input text using at least one neural network;
    determining one or more text modifications to the one or more amendable portions of the input text, the one or more text modifications encompassing at least one set of one or more stylistic parameters, wherein said determining comprises processing at least a portion of the at least one set of one or more stylistic parameters using the at least one neural network;
    generating at least one stylized output set of text by transforming at least a portion of the input text, wherein said transforming comprises:
        modifying at least a portion of the one or more amendable portions of the input text via at least one of the one or more text modifications; and
        implementing at least one loss function associated with loss pertaining to at least one divergence between one or more input stylistic control parameter scores and one or more stylistic control parameter scores associated with the at least one stylized output set of text and computed using one or more natural language processing scorers; and
    outputting at least a portion of the at least one stylized output set of text to at least one user;
    wherein the method is carried out by at least one computing device.

2. The computer-implemented method of claim 1, wherein (i) the input text and (ii) the set of one or more stylistic parameters are provided by the at least one user.

3. The computer-implemented method of claim 1, wherein the set of one or more stylistic parameters is represented by a vector.

4. The computer-implemented method of claim 1, wherein the set of one or more stylistic parameters comprises one or more tunable stylistic parameters.

5. The computer-implemented method of claim 1, wherein said transforming comprises implementing one or more natural language processing systems.

6. The computer-implemented method of claim 5, wherein the one or more natural language processing systems comprises one or more rule-based classifiers.

7. The computer-implemented method of claim 5, wherein the one or more natural language processing systems comprises one or more machine learning-based classifiers.

8. The computer-implemented method of claim 5, wherein the one or more natural language processing systems comprises at least one of one or more regressors and one or more metric computation systems.

9. The computer-implemented method of claim 1, wherein said transforming comprises implementing one or more bi-directional long short-term memory networks trained in an unsupervised fashion.

10. The computer-implemented method of claim 1, wherein implementing at least one loss function comprises implementing a softmax function that facilitates calculation of a composite loss function.

11. The computer-implemented method of claim 10, wherein the composite loss function comprises loss pertaining to a semantic deviation of the stylized output set of text from the input text.

12. The computer-implemented method of claim 1, comprising:
adding one or more stylistic parameters to the set of one or more stylistic parameters.

13. The computer-implemented method of claim 12, comprising
adding, to the at least one neural network to measure the one or more added stylistic parameters, at least one of (i) at least one classifier corresponding to the one or more added stylistic parameters, (ii) at least one regressor corresponding to the one or more added stylistic parameters, and (iii) at least one metric corresponding to the one or more added stylistic parameters; and
training the at least one neural network after said adding.

14. The computer-implemented method of claim 1, comprising:
removing one or more stylistic parameters from the set of one or more stylistic parameters.

15. The computer-implemented method of claim 14, comprising:
removing, from the at least one neural network, at least one of (i) at least one classifier corresponding to the one or more removed stylistic parameters, (ii) at least one regressor corresponding to the one or more removed stylistic parameters, and (iii) at least one metric corresponding to the one or more removed stylistic parameters; and
training the at least one neural network after said removing.

16. A computer program product comprising a computer readable storage medium having program instructions embodied therewith, the program instructions executable by a computing device to cause the computing device to:
identify one or more amendable portions of input text by processing at least a portion of the input text using at least one neural network;
determine one or more text modifications to the one or more amendable portions of the input text, the one or more text modifications encompassing at least one set of one or more stylistic parameters, wherein said determining comprises processing at least a portion of the at least one set of one or more stylistic parameters using the at least one neural network;
generate at least one stylized output set of text by transforming at least a portion of the input text, wherein said transforming comprises:
modifying at least a portion of the one or more amendable portions of the input text via at least one of the one or more stylistic text modifications; and
implementing at least one loss function associated with loss pertaining to at least one divergence between one or more input stylistic control parameter scores and one or more stylistic control parameter scores associated with the at least one stylized output set of text and computed using one or more natural language processing scorers; and
output at least a portion of the at least one stylized output set of text to at least one user.

17. The computer program product of claim 16, wherein implementing at least one loss function comprises implementing a softmax function that facilitates calculation of a composite loss function.

18. A system comprising:
a memory; and
at least one processor operably coupled to the memory and configured for:
identifying one or more amendable portions of input text by processing at least a portion of the input text using at least one neural network;
determining one or more text modifications to the one or more amendable portions of the input text, the one or more text modifications encompassing at least one set of one or more stylistic parameters, wherein said determining comprises processing at least a portion of the at least one set of one or more stylistic parameters using the at least one neural network;
generating at least one stylized output set of text by transforming at least a portion of the input text, wherein said transforming comprises:
modifying at least a portion of the one or more amendable portions of the input text via at least one of the one or more text modifications; and
implementing at least one loss function associated with loss pertaining to at least one divergence between one or more input stylistic control parameter scores and one or more stylistic control parameter scores associated with the at least one stylized output set of text and computed using one or more natural language processing scorers; and
outputting at least a portion of the at least one stylized output set of text to at least one user.

19. The system of claim 18, wherein implementing at least one loss function comprises implementing a softmax function that facilitates calculation of a composite loss function.

* * * * *